US010173691B2

United States Patent
Surnilla et al.

(10) Patent No.: US 10,173,691 B2
(45) Date of Patent: Jan. 8, 2019

(54) VEHICLE SENSOR CALIBRATION USING WIRELESS NETWORK-CONNECTED SENSORS

(71) Applicant: Ford Global Technologies, LLC, Dearborn, MI (US)

(72) Inventors: Gopichandra Surnilla, West Bloomfield, MI (US); Radhakrishnan Swaminathan, Grand Blanc, MI (US); Daniel A. Makled, Dearborn, MI (US); Michael Mcquillen, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 15/356,143

(22) Filed: Nov. 18, 2016

(65) Prior Publication Data

US 2018/0141567 A1     May 24, 2018

(51) Int. Cl.
| | | |
|---|---|---|
| *B60W 50/02* | (2012.01) | |
| *G07C 5/00* | (2006.01) | |
| *H04W 4/02* | (2018.01) | |
| *H04W 84/12* | (2009.01) | |

(52) U.S. Cl.
CPC ......... *B60W 50/0225* (2013.01); *G07C 5/008* (2013.01); *H04W 4/023* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,646,336 B2* | 1/2010 | Tan | .................. | G01S 19/49 342/357.31 |
| 7,689,321 B2* | 3/2010 | Karlsson | .............. | G05D 1/0246 318/103 |
| 8,548,671 B2 | 10/2013 | Wong et al. | | |
| 2007/0239350 A1* | 10/2007 | Zumsteg | ................ | G01C 21/12 701/408 |
| 2008/0144442 A1* | 6/2008 | Combee | ................... | G01V 1/22 367/131 |

(Continued)

FOREIGN PATENT DOCUMENTS

| | | |
|---|---|---|
| CN | 103175566 A | 6/2013 |
| CN | 204256492 U | 4/2015 |
| EP | 3115745 A1 | 1/2017 |

OTHER PUBLICATIONS

Search Report dated Apr. 12, 2018 for Great Britain Patent Application No. GB1718911.9 (3 Pages).

*Primary Examiner* — Rami Khatib
(74) *Attorney, Agent, or Firm* — James P. Muraff; Neal, Gerber & Eisenberg LLP

(57) ABSTRACT

Method and apparatus are disclosed for vehicle sensor calibration using wireless network-connected sensors. An example disclosed vehicle includes a communication controller and a sensor manager. The example communication controller communicatively couples to a network associated with a facility. The example sensor manager determines when the vehicle is proximate the facility. Additionally, the sensor manager calibrates sensors of the vehicle based on a measurement data of sensors installed at the facility that are communicatively coupled to the network.

15 Claims, 3 Drawing Sheets

(56) References Cited

U.S. PATENT DOCUMENTS

| | | | |
|---|---|---|---|
| 2009/0039170 A1* | 2/2009 | Burns | B60H 1/00785 236/44 A |
| 2011/0125323 A1* | 5/2011 | Gutmann | G05D 1/0234 700/258 |
| 2013/0211782 A1* | 8/2013 | Rosenberg | B25J 9/16 702/182 |
| 2014/0136135 A1 | 5/2014 | Drukier et al. | |
| 2014/0149145 A1 | 5/2014 | Peng et al. | |
| 2015/0070207 A1 | 3/2015 | Millar et al. | |
| 2015/0161830 A1 | 6/2015 | Lenhardt et al. | |
| 2016/0231192 A1 | 8/2016 | Hammers | |
| 2016/0259032 A1* | 9/2016 | Hehn | G01S 5/0289 |
| 2017/0212215 A1* | 7/2017 | Hellinger | G01S 7/4026 |
| 2018/0011168 A1* | 1/2018 | Tanaka | G01S 5/30 |

* cited by examiner

VEHICLE SENSOR CALIBRATION USING WIRELESS NETWORK-CONNECTED SENSORS

TECHNICAL FIELD

The present disclosure generally relates to vehicle sensors and, more specifically, vehicle sensor calibration using wireless network-connected sensors.

BACKGROUND

Vehicles include sensors to measure conditions around the vehicle. Electronic control units of the vehicle use the measurements to control the subsystems of the vehicle. For example, humidity measurements from a vehicle humidity sensor may be used to correct distance measurements made by ultrasonic sensors. Overtime, in the relatively harsh environment in which the vehicle sensors operate, the accuracy of the sensors degrades. This degradation affects the control of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle sensor calibration using wireless network-connected sensors. An example disclosed vehicle includes a communication controller and a sensor manager. The example communication controller communicatively couples to a network associated with a facility. The example sensor manager determines when the vehicle is proximate the facility. Additionally, the sensor manager calibrates sensors of the vehicle based on a measurement data of sensors installed at the facility that are communicatively coupled to the network.

An example method to calibrate first sensors of a vehicle includes, in response to the vehicle being proximate to facility with which it has a relationship, connecting to a wireless local area network of the facility. The example method also includes requesting measurement data from second sensors installed at the facility. The second sensors are communicatively coupled to the wireless local area network of the facility. Additionally, the method includes, based on the measurement data, calibrating the first sensors.

A tangible computer readable medium comprising instructions that, when executed cause a vehicle to, in response to the vehicle being proximate to facility with which it has a relationship, connect to a wireless local area network of the facility. The instructs also cause the vehicle to request measurement data from second sensors installed at the facility, the second sensors being communicatively coupled to the wireless local area network of the facility. Additionally, the instruction causes the vehicle to, based on the measurement data, recalibrate the first sensors.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
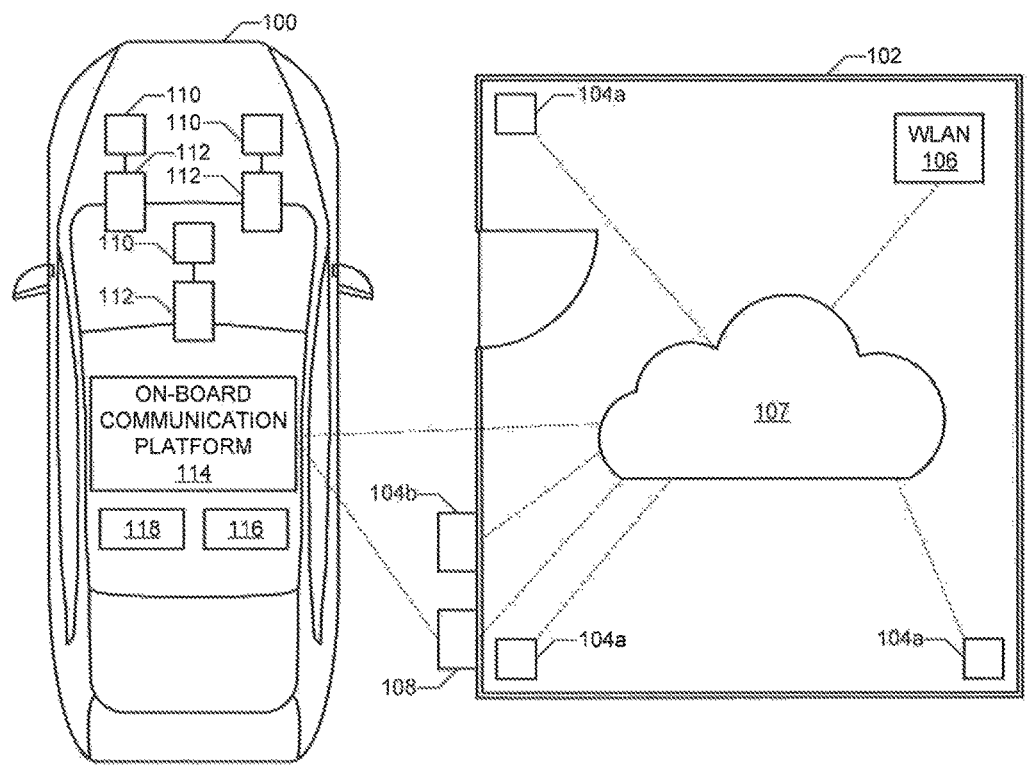
FIG. 1 illustrates a vehicle located in the vicinity of a facility with network-connected sensors in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Increasingly consumer devices include sensors that are connected to a network to provide remotely accessible information and remote control of the devices. Often, these facility-based sensors provide more accurate information than the sensors on vehicle because, for example, (a) they are typically less exposed to noise factors that are found on vehicles, (b) they often cost more and are more accurate, and/or (c) they may be less prone to degradation because they are not exposed to the harsh conditions the vehicle endures. As used herein, the term "facility-based sensors" refers to sensors (a) install in or around a permanent facility (e.g., a house, a gas station, etc.) and/or (b) installed on devices located in or around the facility. These facility-based sensors are connected to a network (e.g., a location area network, the Internet, etc.) and provide measurements over the network.

As disclosed below, a vehicle detects when it is in the vicinity of a facility in which the vehicle has a relationship. As used herein, the vehicle has a relationship with the facility when (a) the vehicle has been bonded (e.g., for a personal area network) and/or credentialed (e.g., for a wireless local area network) to access the network at the facility, and (b) the vehicle has access to sensor measurements from the facility-based sensors via the network. The vehicle determines when it is in the vicinity with such as facility using a global positioning system (GPS) receiver and/or being within range to connect to the network. In some examples, the vehicle detects that it is in the vicinity of a facility at which it has a relationship and then awakes a communication controller to establish a connection with the facility.

Once a connection is established, the vehicle receives a list of sensors at the facility and associated estimated accuracy of the sensors. The vehicle compares the estimated accuracy of the sensors available at the facility with the calibrations of the sensors of the vehicle. For the facility sensors that (a) have a greater estimated accuracy than the vehicle sensors (b) have a greater estimated accuracy than previous calibrations (e.g., from other facilities, etc.), the vehicle performs a calibration strategy on the vehicle sensor.

In some examples, the calibration strategy used for different vehicle sensors is different based on which sensor is being calibrated. For example, the calibration strategies may include an offset or gain application, simple value substitution, transfer function shift, and/or a sweep calibration, etc. Additionally, the vehicle stores the estimated accuracy of the facility sensor.

FIG. 1 illustrates a vehicle 100 located in the vicinity of a facility 102 with network-connected sensors 104a and 104b in accordance with the teachings of this disclosure. The example facility 102 is any suitable location with network-connected sensors 104a and 104b that are connected to a network, such as a house, a gas station, an auto dealership, and/or a parking garage, etc. In the illustrated example, the facility 102 includes the network-connected sensors 104a and 104b, and a network communication controller 106. In some examples, the facility 102 also includes a network bridge 108.

The network-connected sensors 104a and 104b measure the environment around the facility 102. The network-connected sensors 104a and 104b include humidity sensors, temperature sensors, pressure sensors, air quality sensors, ambient light sensors, and/or rain sensors, etc. In some examples, the network-connected sensors 104a are stand alone sensors (e.g., sensors that are not incorporated into another device) and/or sensors that are incorporated into another device, such as an appliance. For example, the network-connected sensors 104a may be incorporated into a weather station. In some examples, the network-connected sensors 104b are incorporated into a sensor package designed to have the sensors (e.g., the sensors 110 below) of the vehicle 100. For example, a sensor package 104b may be manufactured for a specific vehicle 100 and included when the vehicle 100 is purchased. In the illustrated example, the sensor package 104b is affixed to a wall of the facility (e.g., a wall of a garage in which the vehicle 100 parks). When requested, the network-connected sensors 104a and 104b (or, in some examples, a controller of the sensor package 104b) provide measurement data. The measurement data includes (i) a sensor reading, and (ii) an estimated accuracy of the corresponding network-connected sensors 104a and 104b. For examples, a barometer of a network-connected weather station may have an accuracy of ±0.08 inHg (inches of mercury). The network-connected sensors 104a and 104b share the measurement data on a network 107 via a connected to the network communication controller 106.

The network communication controller 106 facilitates the connection of the network-connected sensors 104a and 104b to a network. The network communication controller 106 includes hardware (e.g., processors, memory, storage, antenna, etc.) and software to control wireless network interfaces. In some examples, the network communication controller 106 is a wireless local area network (WLAN) controller that establishes a wireless location area network (e.g., the network 107) implementing a WLAN protocol (e.g., IEEE 802.11 a/b/g/n/ac, etc.). In some examples, the network-connected sensors 104a and 104b upload senor readings to one or more external servers (not shown) via the network communication controller 106. The network 107 may utilize a variety of networking protocols now available or later developed including, but not limited to, TCP/IP-based networking protocols.

The network bridge 108 is communicatively coupled to the network communication controller 106. The network bridge 108 provides a communication interface to the vehicle 100 when, for example, the vehicle 100 does not include a network controller to connect to the WLAN network 107 of the network communication controller 106. The example network bridge 108 includes hardware (e.g., processors, memory, storage, antenna, etc.) and software to control wireless network interfaces, such as Bluetooth® and Bluetooth® Low Energy (BLE) (as specified by the Bluetooth Specification and subsequent revisions maintained by the Bluetooth Special Interest Group), Z-Wave® (as specified by the Z-Wave Specification maintained by the Z-Wave Alliance), and/or Zigbee® (IEEE 802.15.4). In examples in which the network bridge 108 is used, the vehicle 100 communicatively couples to the network bridge 108. The vehicle 100 then receives measurement data from the network-connected sensors 104a and 104b connected to the network 107 via the network bridge 108.

The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes sensors 110, electronic control units (ECUs) 112, an on-board communications platform 114, a global positioning system (GSP) receiver 116, and a sensor manager 118.

The sensors 110 may be arranged in and around the vehicle 100 in any suitable fashion. The sensors 110 may be mounted to measure properties around the exterior of the vehicle 100. Additionally, some sensors 110 may be mounted inside the cabin of the vehicle 100 or in the body of the vehicle 100 (such as, the engine compartment, the wheel wells, etc.) to measure properties in the interior of the vehicle 100. For example, such sensors 110 may include accelerometers, odometers, tachometers, pitch and yaw sensors, wheel speed sensors, microphones, tire pressure sensors, and biometric sensors, etc. In the illustrated example, the sensors 110 are electrically coupled to the ECUs 112 to provide sensor readings to the ECUs 112. Overtime, the calibration of the sensors 110 may degrade as the sensors 110 are exposed to harsh environments (e.g., weather, internal heat of the engine compartment, etc.).

The ECUs 112 monitor and control the subsystems of the vehicle 100. The ECUs 112 communicate and exchange information via a vehicle data bus (e.g., the vehicle data bus 204 of FIG. 2 below). Additionally, the ECUs 112 may communicate properties (such as, status of the ECU 112, sensor readings, control state, error and diagnostic codes, etc.) to and/or receive requests from other ECUs 112. Some vehicles 100 may have seventy or more ECUs 112 located in various locations around the vehicle 100 communicatively coupled by the vehicle data bus 204. The ECUs 112 are discrete sets of electronics that include their own circuit(s) (such as integrated circuits, microprocessors, memory, storage, etc.) and firmware, sensors, actuators, and/or mounting hardware. The ECUs 112 use the sensor readings from the sensors 110 of the vehicle 100 to control the subsystems of the vehicle 100. For example, the advanced driving assistance system (ADAS) may use the sensor readings to adjust distance calculations based on the sensor readings from a humidity sensor and a temperature sensor, and/or a powertrain control unit may control the traction control system based on sensor reading from a rain sensor. Additionally, the ECUs 112 maintain a calibration profile to the sensors 110 that adjusts readings from the sensors 110. Originally, the calibration profile may be performed during a manufacturer process. As disclosed below, the calibration profile is updated from time to time by the sensor manager 118. Example ECUs 112 include the ADAS, the powertrain control unit, a autonomy unit (e.g., an ECU 112 that controls the motive functions of the vehicle 100 when the vehicle 100 is autonomous), a telematics unit.

The on-board communications platform 114 includes wired or wireless network interfaces to enable communication with external networks. The on-board communications platform 114 also includes hardware (e.g., processors, memory, storage, antenna, etc.) and software to control the wired or wireless network interfaces. The on-board communications platform 114 includes one or more wireless controller(s) for wide area networks (e.g., Global System for Mobile Communications (GSM), Universal Mobile Telecommunications System (UMTS), Long Term Evolution (LTE), Code Division Multiple Access (CDMA), WiMAX (IEEE 802.16m), etc.), wireless local area wireless networks (e.g, IEEE 802.11 a/b/g/n/ac or others, dedicated short range communication (DSRC), etc.) and/or personal area networks (e.g., Bluetooth®, Bluetooth® Low Energy, Z-Wave®, Zigbee®, etc.). The on-board communications platform 114 connects to the network 107 provided by the network communication controller 106 or the network bridge 108 of the facility 102 to receive measurement data from the network-connected sensors 104a and 104b of the facility 102. In some examples, the on-board communications platform 114 connects to a server on an external network (e.g., the Internet) via a cellular modem. In such examples, the network-connected sensors 104a and 104b of the facility 102 upload measurement data to the server to be retrieved via the on-board communications platform 114.

The sensor manager 118 generates calibration profiles for the ECUs 112 based on measurement data from network-connected sensors 104a and 104b when the vehicle 100 is within a threshold distance (e.g., ten feet, twenty feet, thirty feet, etc.) (sometimes referred to as the "vicinity"). Even in examples where the sensor manager 118 is communicating with an external server on the Internet to receiving measurement data from the network-connected sensors 104a and 104b, the sensor manager 118 determines whether to recalibrate the sensors 110 when the vehicle 100 is in the vicinity of the facility so that the sensors 110 are measuring substantially the same phenomenon (e.g., the same pressure, the same ambient light, the same, temperature, etc.) as the network-connected sensors 104a and 104b. The sensor manager 118 determines when the vehicle 100 is in the vicinity of the facility 102 based on coordinates of the facility (e.g., stored in memory) and coordinates of the vehicle 100 provided by the GPS receiver 116. In some examples, when the vehicle 100 does not includes the GPS receiver 116, the sensor manager 118 determines the vehicle 100 is in the vicinity of the facility 102 when the vehicle 100 is within range of the network 107 provided by the network communication controller 106 and/or the network bridge 108. In some examples, the sensor manager 118 determines the coordinates of the facility 102 when the sensor manager 118 develops a relationship with the facility 102.

When the vehicle 100 is in the vicinity of the facility 102, sensor manager 118 establishes a connection with the network 107 of the facility 102. The sensor manager 118 requests a list of the network-connected sensors 104a and 104b connected to the network 107 and corresponding measurement data (e.g., a sensor reading and estimated accuracy). In some examples, the sensor manager 118 requests the list and the corresponding measurement data from the facility 102 whenever the vehicle 100 is in the vicinity because (a) the facility 102 may add network-connected sensors 104a and 104b from time-to-time, and (b) the sensors 110 of the vehicle 100 may continue to degrade.

The sensor manager 118 monitors the sensors 110 of the vehicle 100 (e.g., via the calibration profiles of the sensors 110) to determine the estimated accuracy of the sensor 110, the current sensor reading and/or the most recent date of calibration of the sensor 110. Based on the calibration profiles of the sensors 110 and the measurement data from the network-connected sensors 104a and 104b, the sensor manager 118 determines whether to recalibrate one or more of the sensors 110. For example, the estimated accuracy of the corresponding network-connected sensor 104a and 104b may be greater than the estimated accuracy of network-connected sensor 104a and 104b used to previously calibrate the sensor 110. As another example, a comparison of the sensor reading from the sensor 110 and the measurement data from the corresponding network-connected sensor 104a and 104b may indicate that the accuracy of the sensor 110 has degraded more since the last calibration. For example, if the sensor 110 of the vehicle 100 is a humidity sensor with an accuracy of ±4.0 percent relative humidity and one of the network-connected sensors 104a and 104b is a humidity sensor with an accuracy of ±2.0 percent relative humidity, then the sensor manager 118 may generate a calibration profile for the sensor 110.

If the sensor(s) 110 is/are to be recalibrated, the sensor manager 118 generates the calibration profile(s) for the sensor(s) 110. The sensor manager 118 calibrates the sensors 110 using a calibration strategy. The calibration strategy is based on the particular sensor 110 is being calibrated. The calibration strategies include an offset or gain application, simple value substitution, transfer function shift, and/or a sweep calibration, etc. For example, if the sensor 110 of the vehicle 100 is a humidity sensor that measures 71 percent relative humidity and the one of the network-connected sensors 104a and 104b is a humidity sensor that measures 68 percent relative humidity, the sensor manager 118 may generates the calibration profile for the sensor indicating (a) the calibration strategy is an offset, (b) the estimated accuracy of the network-connected sensor 104a and 104b is ±2.0 percent relative humidity, and (c) the offset is 3% relative humidity. The sensor manager 118 communicates the calibration profiles to the relevant ECUs 112 (e.g., the ECUs 112 that use the sensor readings from the particular sensor 110).

When the vehicle 100 is initially in the vicinity of the facility 102, the sensor manager 118 develops a relationship with the network 107 of the facility 102 via the on-board communications platform 114. When prompted by a user (e.g., via a center console display (not shown)), the sensor manager 118 detects the network 107 (e.g., by detecting the network 107 or detecting the network bridge 108). The on-board communications platform 114 bonds with the network communication controller 106 though, for example, providing credentials (e.g. password, etc.). After bonding, the sensor manager 118 subsequently connects to the network 107 when the network 107 is within range.

Figure 2:
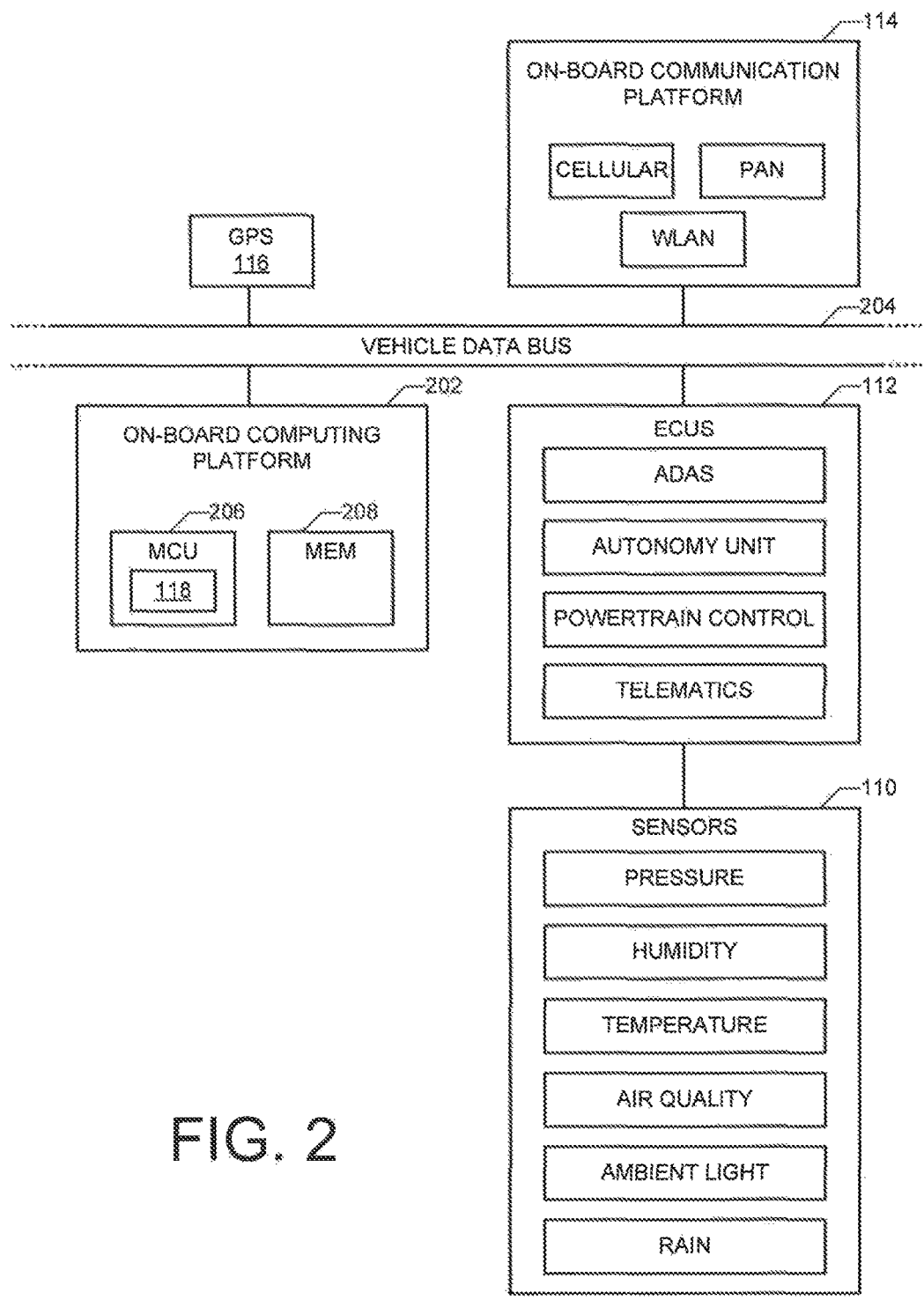
FIG. 2 is a block diagram of electronic components of the vehicle of FIG. 1

FIG. 2 is a block diagram of electronic components 200 of the vehicle 100 of FIG. 1. The electronic components 200 include the sensors 110, the ECUs 112, the on-board communications platform 114, the GPS receiver 116, an on-board computing platform 202, and a vehicle data bus 204.

The on-board computing platform 202 includes a processor or controller 206 and memory 208. In some examples, the on-board computing platform 202 is structured to include the sensor manager 118. Alternatively, in some examples, the sensor manager 118 is incorporated into another ECU 112 (e.g., the ADAS, the telematics unit, etc.) with its own processor and memory. The processor or controller 206 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 208 includes multiple kinds of memory, particularly volatile memory and non-volatile memory.

The memory 208 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 208, the computer readable medium, and/or within the processor 206 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The vehicle data bus 204 communicatively couples the ECUs 112, the on-board communications platform 114, the GPS receiver 116, and/or the on-board computing platform 202, etc. In some examples, the vehicle data bus 204 includes one or more data buses. The vehicle data bus 204 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/or a K-line bus protocol (ISO 9141 and ISO 14230-1), and/or an Ethernet™ bus protocol IEEE 802.3 (2002 onwards), etc.

Figure 3:
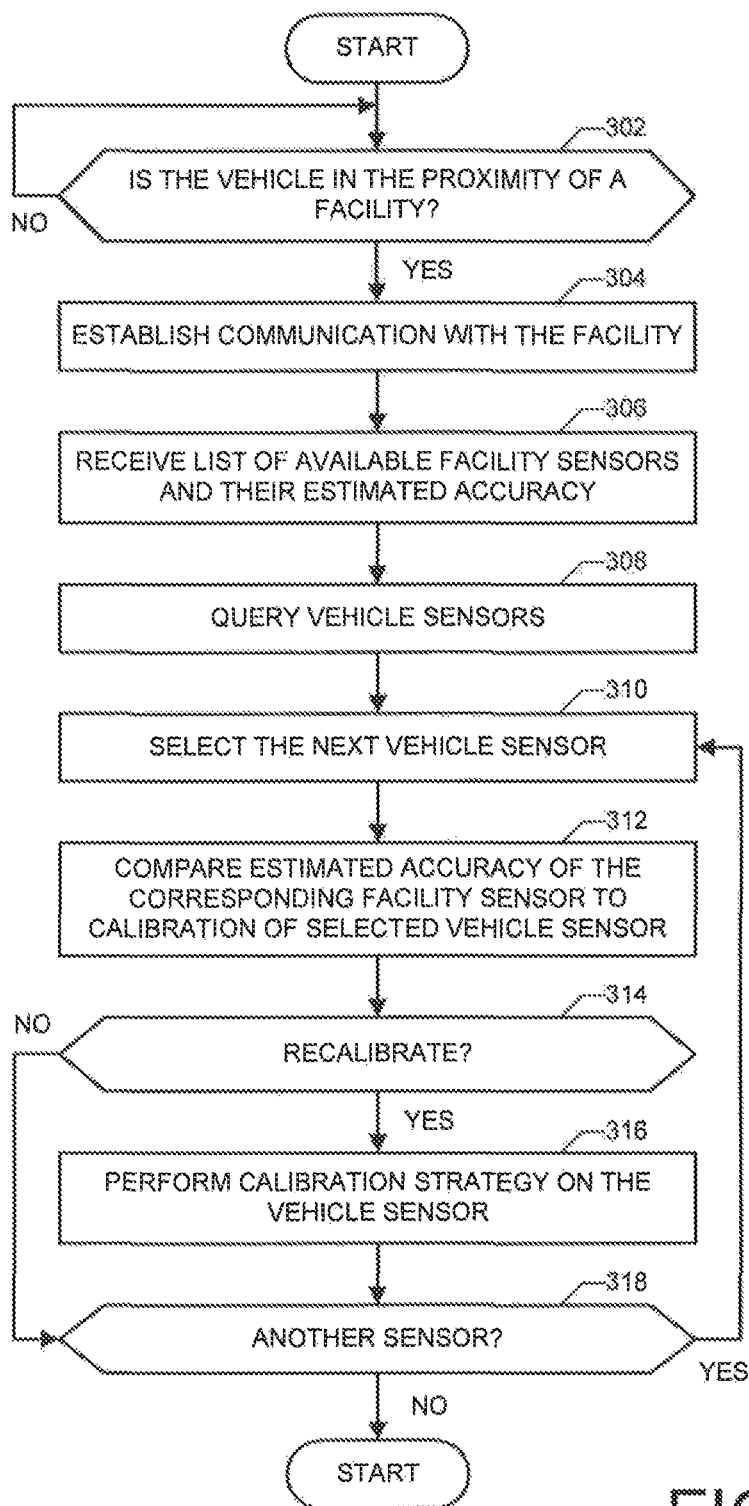
FIG. 3 is a flowchart of a method to calibrate sensors of the vehicle of FIG. 1 using the network connected sensors of the facility, which may be implemented by the electronic components of FIG. 2.

FIG. 3 is a flowchart of a method to calibrate the sensors 110 of the vehicle 100 of FIG. 1 using the network-connected sensors 104a and 104b of the facility 102, which may be implemented by the electronic components 200 of FIG. 2. Initially, at block 302, the sensor manager 118 waits until the vehicle 100 is in the proximity of the facility 102. The sensor manager 118 uses the coordinates from the GPS receiver 116 and/or monitors the availability of the network(s) associated with the facility 102 to determine when the vehicle 100 is proximate the facility 102. At block 304, the sensor manager 118 establishes communication with the facility 102 via the network 107. In some examples, the sensor manager 118 connects with the network bridge 108 via a personal area network protocol.

At block 306, the sensor manager 118 receives a list of the network-connected sensors 104a and 104b that are connected to the network 107. In some examples, the list also includes measurement data (e.g., sensor reading(s) and estimated accuracy) from the network-connected sensors 104a and 104b. At block 308, the sensor manager 118 queries the sensors 110 of the vehicle 100. The sensors 110 and/or the associated ECU(s) 112 provide the current estimated accuracy of the sensor 110 and a sensor reading from the sensor 110.

At block 310, the sensor manager 118 selects the next one of the sensors 110 to analyze. At block 312, the sensor manager 118 compares the estimated accuracy of the corresponding network-connected sensor 104a and 104b to the estimates accuracy of the sensor 110 selected at block 310. In some examples, the sensor manager 118 also compares the sensor readings of the corresponding network-connected sensor 104a and the selected sensor 110. In some such examples, the sensor manager 118 requests several sensor readings from the selected sensor 110 and the corresponding network-connected sensor 104a and 104b and considers the average values of the sensor readings over a period of time. At block 314, the sensor manager 118 determines whether to recalibrate the selected sensor 110. The sensor manager 118 determines to recalibrate the selected sensors 110 when (a) the corresponding network-connected sensor 104a and 104b is more accurate than the sensor 110 and/or (b) sensor readings (or the average sensor readings) differ by a threshold value (e.g., the threshold being the estimated error of the network-connected sensor 104a and 104b). For example, if (i) the sensor 110 of the vehicle 100 is a humidity sensor with an accuracy of ±4.0 percent relative humidity, (ii) the corresponding network-connected sensor 104a and 104b has an accuracy of ±2.0 percent relative humidity, and (iii) the average difference between the sensor readings is 2.6 percent relative humidity, the sensor manager 118 may recalibrate the selected sensor 110. At block 316, the sensor manager 118 performs a calibration strategy on the selected sensor 110 based on the accuracy and the sensor reading(s) of the corresponding network-connected sensor 104a and 104b. At block 318, the sensor manager 118 determines whether there is another sensor 110 to analyze. If there is another sensor 110, the method returns to block 310. Otherwise, if there is not another sensor 110, the method ends.

The flowchart of FIG. 3 is representative of machine readable instructions stored in memory (such as the memory 208 of FIG. 2) that comprise one or more programs that, when executed by a processor (such as the processor 206 of FIG. 2), cause the vehicle 100 to implement the example sensor manager 118 of FIGS. 1 and 2. Further, although the example program(s) is/are described with reference to the flowchart illustrated in FIG. 3, many other methods of implementing the example sensor manager 118 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes,"

"including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   first sensors; and
   processors to:
   responsive to the vehicle being proximate to a facility including second sensors installed therein:
   communicatively couple to a network associated with the facility;
   calibrate the first sensors based on measurement data from the second sensors; and
   receive, from the facility, a list of sensors available in the facility for a comparison with at least one of the first sensors.

2. The vehicle of claim 1, wherein the measurement data includes a sensor reading of one of the second sensors and an estimate of a first accuracy of the one of the second sensors.

3. The vehicle of claim 2, wherein a sensor manager is to calibrate one of the first sensors when the estimate of the first accuracy is greater than an estimate of a second accuracy of the one of the first sensors.

4. The vehicle of claim 2, wherein the processors are to calibrate one of the first sensors when a difference of sensor readings between the one of the first sensors and the one of the second sensors is greater than the estimate of the first accuracy of the one of the second sensors.

5. The vehicle of claim 1, wherein to calibrate the first sensors, the processors are to perform one of a plurality of calibration strategies based on particular ones of the first sensors to be calibrated.

6. The vehicle of claim 5, wherein the plurality of calibration strategies available to the processors include an offset application, a gain application, a value substitution, transfer function shift, and a sweep calibration.

7. The vehicle of claim 1, wherein the second sensors are installed together in a sensor package that is designed for the vehicle.

8. A method to calibrate first sensors of a vehicle comprising:
   responsive to the vehicle being proximate to a facility including second sensors installed therein:
   communicatively coupling, via processors, to a wireless local area network associated with the facility;
   requesting, via the processors, measurement data from the second sensors;
   based on the measurement data, calibrating, via the processors, the first sensors; and
   receiving, from the facility, a list of sensors available in the facility for a comparison with at least one of the first sensors.

9. The method of claim 8, wherein the measurement data includes a sensor reading of one of the second sensors and an estimate of a first accuracy of the one of the second sensors.

10. The method of claim 9, including determining to calibrate one of the first sensors when the estimate of the first accuracy is greater than an estimate of a second accuracy of the one of the first sensors.

11. The method of claim 9, including determining to calibrate one of the first sensors when a difference of sensor readings between the one of the first sensors and the one of the second sensors is greater than the estimate of the first accuracy of the one of the second sensors.

12. The method of claim 8, wherein calibrating the first sensors includes performing one of a plurality of calibration strategies based on particular ones of the first sensors of the vehicle to be calibrated.

13. The method of claim 12, wherein the plurality of calibration strategies include an offset application, a gain application, a value substitution, transfer function shift, and a sweep calibration.

14. The method of claim 8, wherein the second sensors are installed together in a sensor package that is designed for the vehicle.

15. A non-transitory, computer-readable medium comprising instructions that, when executed via processors, cause a vehicle including first sensors to:
   responsive to the vehicle being proximate to a facility including second sensors installed therein:
   connect to a wireless local area network of the facility;
   request measurement data from the second sensors;
   calibrate the first sensors based on the measurement data; and
   receive, from the facility, a list of sensors available in the facility for a comparison with at least one of the first sensors.

* * * * *